United States Patent
Morohashi et al.

(10) Patent No.: US 10,634,909 B2
(45) Date of Patent: Apr. 28, 2020

(54) DISPLAY DEVICE AND HEAD-UP DISPLAY

(71) Applicant: NIPPON SEIKI CO., LTD., Niigata (JP)

(72) Inventors: Kazuo Morohashi, Niigata (JP); Megumi Sato, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 32 days.

(21) Appl. No.: 16/073,685

(22) PCT Filed: Feb. 2, 2017

(86) PCT No.: PCT/JP2017/003822
§ 371 (c)(1),
(2) Date: Jul. 27, 2018

(87) PCT Pub. No.: WO2017/138431
PCT Pub. Date: Aug. 17, 2017

(65) Prior Publication Data
US 2019/0025582 A1 Jan. 24, 2019

(30) Foreign Application Priority Data

Feb. 8, 2016 (JP) .................................. 2016-021666

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60R 11/02* (2013.01);
(Continued)

(58) Field of Classification Search
None
See application file for complete search history.

(56) References Cited

U.S. PATENT DOCUMENTS

2006/0071877 A1* 4/2006 Kanamori ............ G02B 17/023
 345/7
2014/0036374 A1 2/2014 Lescure et al.
(Continued)

FOREIGN PATENT DOCUMENTS

JP 2005-153811 A 6/2005
JP 2015-011211 A 1/2015
(Continued)

OTHER PUBLICATIONS

International Search Report dated Apr. 4, 2017 issued in International Patent Application No. PCT/JP2017/003822 (with English translation).

*Primary Examiner* — Amare Mengistu
*Assistant Examiner* — Sarvesh J Nadkarni
(74) *Attorney, Agent, or Firm* — McDermott Will & Emery LLP

(57) ABSTRACT

The present invention displays multiple images at different locations in the depth direction, while suppressing a decline in display quality, using projected light emitted from a single projector. A projector 20 emits first projection light L1 and second projection light L2 that have a first projection distance P1. A projection distance lengthening unit 251 having a negative refractive power is positioned along the path of the first projection light L1 between the projector 20 and a first screen 23, and causes an image to be formed on the first screen 23 by lengthening the projection distance P of the first projection light L1. A projection distance shortening unit 252 having a positive refractive power is positioned along the path of the second projection light L2 between the projector 20 and a second screen 24, and causes an image to be formed on the second screen 24 by lengthening the projection distance P of the second projection light L2.

18 Claims, 5 Drawing Sheets

(51) Int. Cl.
  *H04N 5/74*    (2006.01)
  *G02B 27/18*   (2006.01)
  *G03B 21/00*   (2006.01)
  *B60R 11/02*   (2006.01)

(52) U.S. Cl.
  CPC .......... *B60R 11/0229* (2013.01); *G02B 27/18*
    (2013.01); *G03B 21/00* (2013.01); *H04N 5/74*
    (2013.01); *H04N 5/7491* (2013.01); *B60K*
      *2370/1529* (2019.05); *B60K 2370/334*
    (2019.05); *B60K 2370/52* (2019.05); *B60K*
    *2370/66* (2019.05); *G02B 2027/011* (2013.01);
      *G02B 2027/0127* (2013.01)

(56) References Cited

U.S. PATENT DOCUMENTS

| | | | |
|---|---|---|---|
| 2016/0178902 A1 | 6/2016 | Ando et al. | |
| 2017/0309049 A1* | 10/2017 | Law | G02B 27/0101 |
| 2018/0314063 A1* | 11/2018 | Yatsu | B60K 35/00 |
| 2018/0341110 A1* | 11/2018 | Hirata | B60K 35/00 |

FOREIGN PATENT DOCUMENTS

| | | |
|---|---|---|
| JP | 2015-34919 A | 2/2015 |
| WO | 2016/027706 A1 | 2/2016 |

* cited by examiner

DISPLAY DEVICE AND HEAD-UP DISPLAY

CROSS REFERENCE

This patent application is the U.S. National Phase under 35 U.S.C. § 371 of International Application No. PCT/JP2017/003822, filed on Feb. 2, 2017, which claims the benefit of Japanese Patent Application No. 2016-021666, filed on Feb. 8, 2016, the entire contents of each are hereby incorporated by reference.

TECHNICAL FIELD

The present invention relates to a display device capable of displaying images on a plurality of surfaces and a head-up display that causes the images displayed by this display device to be visually recognized as virtual images.

BACKGROUND ART

A conventional head-up display is disclosed in, for example, PTL 1. Such a head-up display projects projection light emitted from a single projector onto a first screen and a second screen provided at different distances from the projector and projects images displayed on the respective first and second screens onto a transmission reflection unit positioned in front of a viewer. With this, a virtual image based on the image displayed on the first screen and a virtual image based on the image displayed on the second screen are visually recognized at positions having different distances from the viewer.

CITATION LIST

Patent Literature

PTL 1: JP-A-2015-011211

SUMMARY OF INVENTION

Technical Problem(s)

As illustrated in FIG. 5, in order to cause a single projector 610 to project images onto two screens 620 and 640 disposed at different distances R1 and R2, respectively, the projector 610 emits first projection light 630 for displaying a first image K1 on the first screen 620 and second projection light 650 for displaying a second image K2 onto the second screen 640 disposed to be closer to the projector 610 than the first screen 620 at substantially the same first projection distance R1 and includes a projection distance changing unit 660 that extends the first projection distance R1 of the first projection light 630 to the second projection distance R2 on a path of the first projection light 630 between the projector 610 and the first screen 620. This projection distance changing unit 660 has negative refractive power and is made up of, for example, a concave lens or a convex mirror.

However, in order to adjust the first projection distance R1 of part (first projection light 630) of projection light to the second projection distance R2 that is largely extended as described above, it is necessary to increase a curvature of a curved surface of the projection distance changing unit 660. When this curvature is increased, the first image K1 displayed with the first projection light 630 that has passed through the projection distance changing unit 660 may be distorted.

In view of this, the invention provides a display device and a head-up display, each of which restrains reduction in display quality of an image.

Solution to Problem(s)

In order to solve the above-mentioned problem, a display device according to a first aspect of the invention includes: a projector configured to emit projection light having a first projection distance; a first screen disposed at a position having a distance longer than the first projection distance from the projector along the projection light and configured to receive first projection light of the projection light and display a first image; a second screen disposed at a position having a distance shorter than the first projection distance from the projector along the projection light and configured to receive second projection light of the projection light different from the first projection light and display a second image; a projection distance extending unit disposed on a path of the first projection light between the projector and the first screen, having negative refractive power (optical power), and configured to extend a projection distance of the first projection light; and a projection distance shortening unit disposed on a path of the second projection light between the projector and the second screen, having positive refractive power (optical power), and configured to shorten a projection distance of the second projection light.

Further, a head-up display according to a second aspect of the invention includes: a projector configured to emit projection light having a first projection distance; a first screen disposed at a position having a distance longer than the first projection distance from the projector along the projection light and configured to receive first projection light of the projection light and display a first image; a second screen disposed at a position having a distance shorter than the first projection distance from the projector along the projection light and configured to receive second projection light of the projection light different from the first projection light and display a second image; a projection distance extending unit disposed on a path of the first projection light between the projector and the first screen, having negative refractive power, and configured to extend a projection distance of the first projection light; a projection distance shortening unit disposed on a path of the second projection light between the projector and the second screen, having positive refractive power, and configured to shorten a projection distance of the second projection light; and a projection unit configured to project the first image displayed on the first screen and the second image displayed on the second screen toward a transmission reflection unit that is positioned in front of a viewer and cause the viewer to visually recognize virtual images based on the first image and the second image via the transmission reflection unit, in which the first screen is disposed so that an optical path of light based on the first image travelling toward the viewer is shorter than an optical path of light based on the second image.

Advantageous Effects of Invention

It is possible to display a plurality of images that are displayed at different distances seen a viewer while restraining reduction in display quality.

DESCRIPTION OF EMBODIMENTS

Hereinafter, a first embodiment of a head-up display (hereinafter, referred to as "HUD") 1 and a display device 10 in the invention will be described with reference to the attached drawings.

First Embodiment

Figure 1:
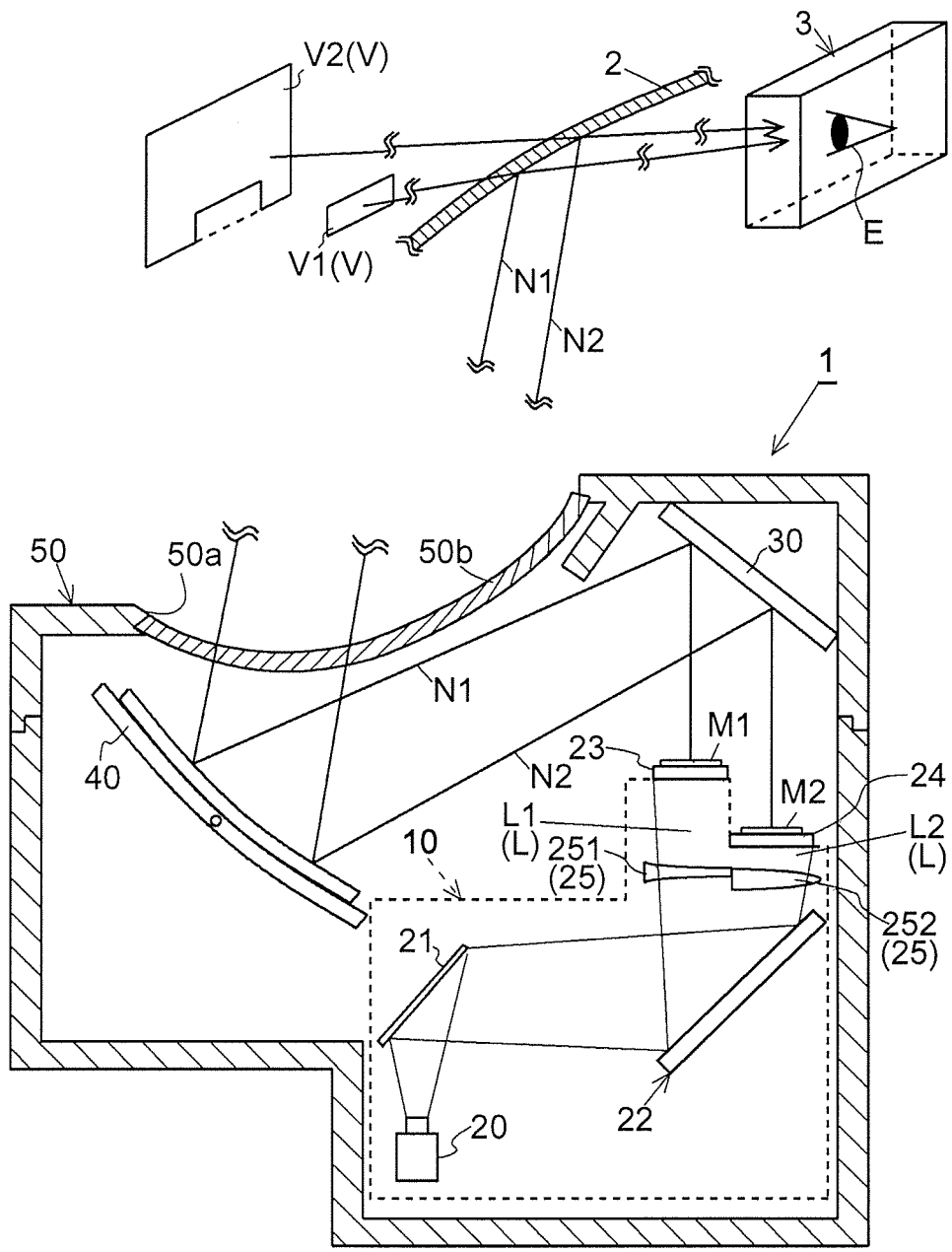
FIG. 1 is a schematic configuration diagram of a head-up display in a first embodiment of the invention.

The HUD 1 is mounted on, for example, an automobile and, as illustrated in FIG. 1, includes the display device 10, a plane mirror (projection unit) 30, a concave mirror (projection unit) 40, a housing 50, and a control board (not shown). The HUD 1 emits first display light N1 of a first image M1 and second display light N2 of a second image M2 displayed by the display device 10 toward a windshield (example of transmission reflection unit) 2 of a vehicle by using the plane mirror 30 and the concave mirror 40. Both the first display light N1 and the second display light N2 reflected by the windshield 2 are distributed in an eye-box 3 having a predetermined space. A viewer E directs his/her point of sight toward inside of the eye-box 3 and can therefore visually recognize a first virtual image V1 of the first image M1 and a second virtual image V2 of the second image M2. Although described in detail below, the display device 10 displays the first image M1 and the second image M2 so that a distance of the first display light N1 to reach a point of sight of the viewer E is shorter than a distance of the second display light N2. With this, the viewer E visually recognizes the first virtual image V1 based on the first image M1 at a position closer than that of the second virtual image V2 based on the second image M2.

The housing 50 is made from, for example, black light-shielding synthetic resin and includes the display device 10, the plane mirror 30, and the concave mirror 40 thereinside, and the control board (not shown) is attached to outside thereof.

The housing 50 has an opening 50a for allowing display light N (first display light N1, second display light N2) to pass through the windshield 2, and this opening 50a is covered with a light-transmissive cover 50b.

The display device 10 displays a plurality of images at different positions, respectively, in a depth direction. The display device 10 in this embodiment displays two images, i.e., the first image M1 and the second image M2 far from this first image M1 in the depth direction. Note that the display device 10 in the invention may display images at three or more different positions, respectively, in the depth direction. A configuration of the display device 10 will be described in detail below.

The plane mirror (projection unit) 30 is obtained by, for example, forming a reflective film on a surface of a base material made from a synthetic resin or glass material by means of vapor deposition or the like and reflects the first display light N1 based on the first image M1 and the second display light N2 based on the second image M2, which are displayed by a first screen 23 and a second screen 24 of the display device 10, toward the concave mirror 40.

Figure 2:
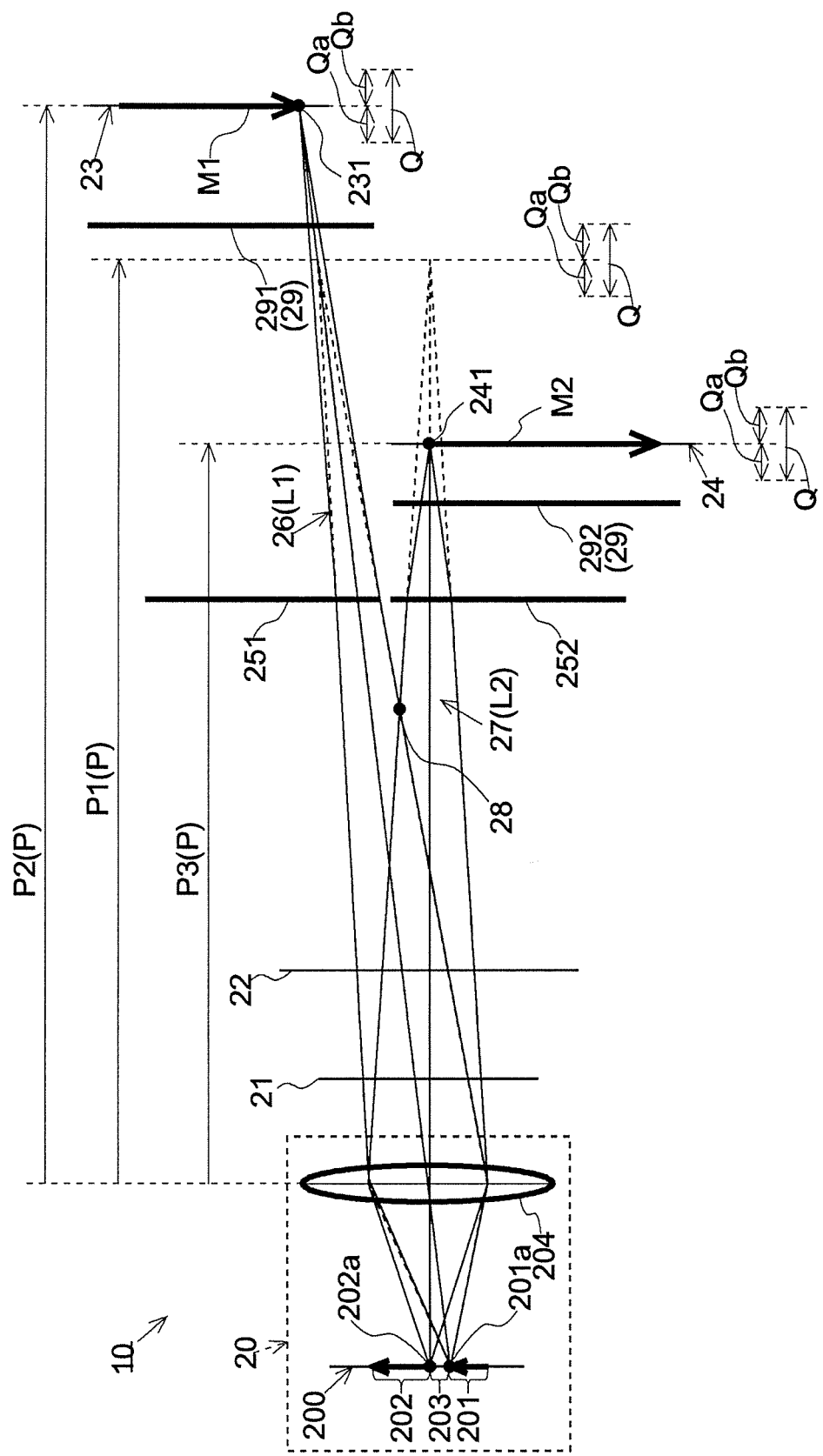
FIG. 2 illustrates a configuration of a display device in the same embodiment and optical paths of projection light.
Figure 3:
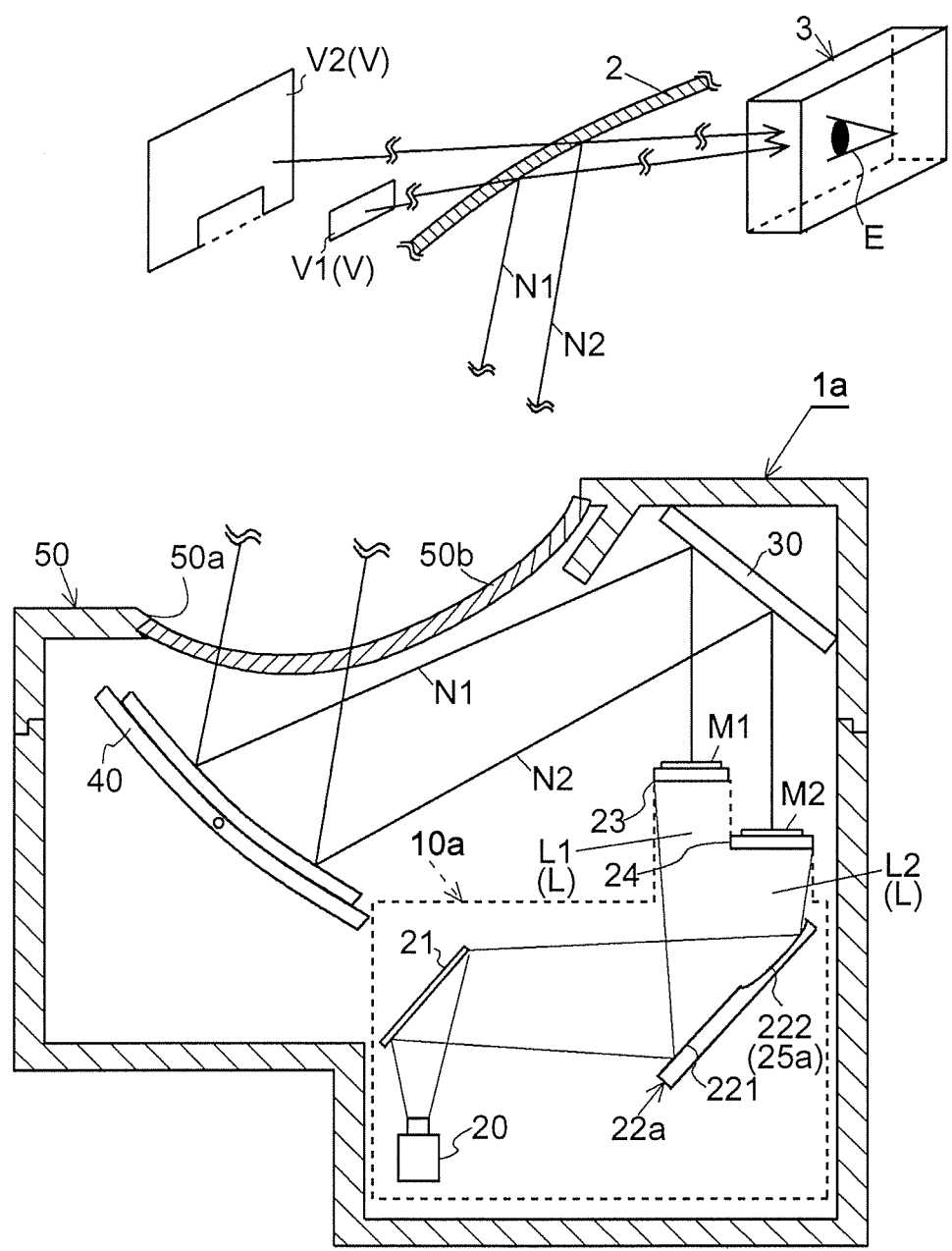
FIG. 3 is a schematic configuration diagram of a head-up display in a second embodiment of the invention.

The concave mirror (projection unit) 40 is obtained by, for example, forming a reflective film on a surface of a base material made from a synthetic resin material by means of vapor deposition or the like and is a mirror having a concave free-form surface that further reflects the first display light N1 and the second display light N2 reflected by the plane mirror 30 and emits the first display light N1 and the second display light N2 toward the windshield 2. The first display light N1 and the second display light N2 reflected by the concave mirror 40 are transmitted through the light-transmissive cover 50b provided in the opening 50a of the housing 50 and reach the windshield 2. The first display light N1 and the second display light N2 are reflected by the windshield 2 toward the viewer E, and the first virtual image V1 based on the first display light N1 and the second virtual image V2 based on the second display light N2 are visually recognized by the viewer E. Note that the concave mirror 40 may function as a magnifier and magnify the first image M1 and the second image M2 displayed on the display device 10 and reflect the first image M1 and the second image M2 toward the windshield 2. Further, the concave mirror 40 may have a function of reducing distortion of the first virtual image V1 and the second virtual image V2 which is caused because the windshield 2 has a curved surface. Further, instead of reflective optical members such as the plane mirror 30 and the concave mirror 40 described above, the HUD 1 in the invention may include a refractive optical member such as a lens or a publicly-known optical member other than those optical members as the projection unit or may be a combination of optical members having different functions such as reflective, refractive, or other types of optical members. Hereinafter, a specific configuration of the display device 10 will be described with reference to FIG. 1 and FIG. 2. FIG. 2 illustrates paths of first projection light L1 and second projection light L2 emitted from the projector 20 and particularly illustrates a path of an image-forming luminous flux 26 that is part of the first projection light L1 and a path of an image-forming luminous flux 27 that is part of the second projection light L2, which are emitted from predetermined pixels 201a and 202a of a display 200 described below.

(Display Device 10)

As illustrated in FIG. 1, the display device 10 includes the projector 20 that emits projection light L, a first fold mirror 21 that reflects and turns back the projection light L from this projector 20, a second fold mirror 22 that reflects and turns back the projection light L from the first fold mirror 21, the first screen 23 that receives the first projection light L1 of the projection light L on a back surface thereof and displays the first image M1 obtained by forming an image of the first projection light L1 on a front surface thereof, the second screen 24 that receives the second projection light L2 of the projection light L on a back surface thereof and displays the second image M2 obtained by forming an image of the second projection light L2 on a front surface thereof, a projection distance extending unit 251 that is disposed on the path of the first projection light L1 between the projector 20 and the first screen 23, has negative refractive power (optical power), and extends a first projection distance P1 that the first projection light L1 has to a second projection distance P2, and a projection distance shortening unit 252 that is disposed on the path of the second projection light L2 between the projector 20 and the second screen 24, has positive refractive power, and shortens the first projection distance P1 that the second projection light L2 has to a third projection distance P3.

As illustrated in FIG. 2, the projector 20 includes the display 200 that generates projection light L and an image forming unit 204 that forms an image of the projection light L generated by the display 200 on a screen (first screen 23) further from the projector 20 and emits the projection light L having a first projection distance P1 equal to an optical path length of the projection light L between the image forming unit 204 and the first screen 23 toward the first fold mirror 21. Note that, hereinafter, part of the projection light L emitted by the projector 20 toward the first screen 23 will be referred to as "first projection light L1", and part of the projection light L emitted toward the second screen 24 will be referred to as "second projection light L2". The projection distance P herein indicates a distance between the image forming unit 204 and a position at which an image of the projection light L is formed and may be referred to as "projecting distance", "image-forming distance", "image-plane distance", or the like. The first projection distances P1 that the first projection light L1 and the second projection light L2 emitted by the projector 20 have do not need to be strictly equal to each other and only need to be substantially equal to each other. Specifically, the first projection distances P1 that the first projection light L1 and the second projection light L2 have only need to be within a focal depth Q within which a substantially focused image can be generated. Note that the focal depth Q includes a front focal depth Qa on the projector 20 (image forming unit 204) side from the first projection distance P1 and a back focal depth Qb on a side opposite the projector 20 (image forming unit 204) side from the first projection distance P1. Specifically, for example, the focal depth Q has a range of about 6 mm including the front focal depth Qa of 3 mm and the back focal depth of 3 mm. Note that the focal depth may be referred to as "image-plane depth".

The display 200 has a display region in which a plurality of pixels are arrayed in matrix, includes, for example, a reflective display element such as a digital micromirror device (DMD) or a liquid crystal on silicon (registered trademark: LCOS) and a transmissive display element such as a thin film transistor (TFT) liquid crystal panel, and emits the projection light L including the first projection light L1 for displaying the first image M1 and the second projection light L2 for displaying the second image M2 toward the first fold mirror 21 on the basis of a control signal from the control board (not shown).

Note that the display region of the display 200 includes a first display region 201 in which the first projection light L1 is generated, a second display region 202 in which the second projection light L2 is generated, and a third display region 203 in which display is not performed and which is positioned between and the first display region 201 and the second display region 202. In order to simplify the drawing, FIG. 2 only illustrates an optical path of the image-forming luminous flux 26 that is emitted from the pixel 201a on a boundary with the third display region 203 in the first display region 201 and forms an image at a point 231 that is the closest to the second screen 24 on the first screen 23 and an optical path of the image-forming luminous flux 27 that is emitted from the pixel 202a on a boundary with the third display region 203 in the second display region 202 and forms an image at a point 241 that is the closest to the first screen 23 on the second screen 24 and omits illustration of an optical path of projection light L other than the above optical paths.

The image forming unit 204 includes a single or plurality of lenses and magnifies and projects the projection light L generated by the display 200 toward the first screen 23 and the second screen 24. Further, the image forming unit 204 adjusts the projection distance P of the projection light L emitted from the projector 20. Specifically, the image forming unit 204 adjusts the projection distance P of the projection light L (first projection light L1, second projection light L2) to the first projection distance P1 equal to the distance between the image forming unit 204 and the first screen 23. In other words, the image forming unit 204 converges the image-forming luminous flux 26 collected from the image forming unit 204 toward the point 231 on the first screen 23 and the image-forming luminous flux 27 collected therefrom toward the point 241 on the second screen 24 at a position having the first projection distance P1 from the image forming unit 204. Note that the image forming unit 204 may include a single or plurality of curved mirrors.

The first fold mirror (reflection unit) 21 is disposed on a path of the projection light L between the projector 20 and the second fold mirror 22 and is made up of a plane mirror that reflects the first projection light L1 and the second projection light L2 emitted from the projector 20 on the same surface toward the second fold mirror 22 and does not have refractive power. An optical path of the projection light L is folded by providing the first fold mirror 21, and therefore a package size of the display device 10 in a primary direction is made more compact. The first fold mirror 21 in this embodiment is disposed to be closer to the projector 20 than a divergence point 28 at which the image-forming luminous flux 26 emitted from the pixel 201a on the boundary with the third display region 203 in the first display region 201 and the image-forming luminous flux 27 emitted from the pixel 202a on the boundary with the third display region 203 in the second display region 202 diverge (at which the first projection light L1 and the second projection light L2 diverge). With this, it is possible to reduce a size of the first fold mirror 21.

Note that a plurality of first fold mirrors 21 may be provided between the projector 20 and the second fold mirror 22, or the first fold mirror 21 may be omitted. Further, the first fold mirror 21 may be disposed further from the projector 20 than the divergence point 28. In a case where the first fold mirror 21 is disposed further from the projector 20 than the divergence point 28 as described above, the first fold mirror 21 may be dividedly provided, i.e., may be made up of a fold mirror that receives the first projection light L1 and a fold mirror that receives the second projection light L2.

The second fold mirror 22 is disposed on the path of the projection light L between the first fold mirror 21 and the first screen 23 and is made up of a plane mirror that reflects the first projection light L1 and the second projection light L2 emitted from the projector 20 toward the first screen 23 and the second screen 24 and does not have refractive power. The optical path of the projection light L is folded by providing the second fold mirror 22, and therefore the package size of the display device 10 in the primary direction is made more compact. The second fold mirror 22 in this embodiment is disposed to be closer to the projector 20 than the divergence point 28 at which the first projection light L1 and the second projection light L2 diverge. With this, it is possible to reduce a size of the second fold mirror 22.

Note that a plurality of second fold mirrors 22 may be provided between the first fold mirror 21 and the first screen 23, or the second fold mirror 22 may be omitted. Further, the second fold mirror 22 may be disposed further from the projector 20 than the divergence point 28. In a case where the second fold mirror 22 is disposed further from the projector 20 than the divergence point 28 as described above, the second fold mirror 22 may be dividedly provided, i.e., may be made up of a fold mirror that receives the first projection light L1 and a fold mirror that receives the second projection light L2.

The first screen 23 is a transmissive screen having a flat surface or curved surface and is made up of, for example, a holographic diffuser, a microlens array, a diffusion plate, and the like. The first screen 23 is disposed at a position that is the projection distance P2 longer than the first projection distance P1 away from the image forming unit 204 of the projector 20 along an optical path of the first projection light L1, receives the first projection light L1 emitted from the projector 20 on a back surface thereof, and displays (forms) the first image M1 on a front surface thereof. When the first screen 23 displays the first image M1, the first display light N1 showing this first image M1 is projected by the projection units (plane mirror 30, concave mirror 40) toward the windshield 2 and is reflected by the windshield 2 toward the viewer E (eye-box 3 having predetermined region). With this, the viewer E directs his/her point of sight toward the inside of the eye-box 3 and can therefore visually recognize the first virtual image V1 on the other side of the windshield 2. Note that the first screen 23 does not need to be provided strictly at a position having the second projection distance P2 and only needs to be provided substantially in the vicinity of the position having the second projection distance P2. Specifically, the first screen 23 only needs to be provided within the focal depth Q within which the substantially focused first image M1 can be generated by an effect of a first light distribution adjustment unit 291.

The second screen 24, as well as the first screen 23, is a transmissive screen having a flat surface or curved surface and is made up of, for example, a holographic diffuser, a microlens array, a diffusion plate, and the like. The second screen 24 is disposed at a position that is the third projection distance P3 shorter than the first projection distance P1 away from the image forming unit 204 of the projector 20 along an optical path of the second projection light L2, receives the second projection light L2 emitted from the projector 20 on a back surface thereof, and displays (forms) the second image M2 on a front surface thereof. When the second screen 24 displays the second image M2, the second display light N2 showing this second image M2 is projected by the plane mirror 30 and the concave mirror 40 described below toward the windshield 2, and the second virtual image V2 is displayed on the other side of the windshield 2 seen from the viewer E. Note that the second screen 24 does not need to be provided strictly at a position having the third projection distance P3 and only needs to be provided substantially in the vicinity of the position having the third projection distance P3. Specifically, the second screen 24 only needs to be provided within the focal depth Q within which the substantially focused second image M2 can be generated by an effect of a second light distribution adjustment unit 292.

As illustrated in FIG. 1, the first screen 23 is disposed further from the projector 20 than the second screen 24. That is, an optical path length of the first display light N1 travelling from the first screen 23 to the viewer E is shorter than an optical path length of the second display light N2 travelling from the second screen 24 toward the viewer E. Therefore, a distance (display distance) between the viewer E and a position at which the first virtual image V1 is displayed is shorter than a distance (display distance) between the viewer E and a position at which the second virtual image V2 is displayed. Thus, the HUD 1 in this embodiment can perform display so that the first virtual image V1 is closer than the second virtual image V2. Note that, in this embodiment, the display distance of the first virtual image V1 is 2 meters, and the display distance of the second virtual image V2 is 5 meters.

Further, the first screen 23 is disposed so that a normal direction thereof is in parallel to an optical axis of the first display light N1 travelling toward the eye-box 3 via the projection units (plane mirror 30, concave mirror 40) and the transmission reflection unit (windshield 2), and, similarly, the second screen 24 is disposed so that a normal direction thereof is in parallel to an optical axis of the second display light N2 travelling toward the eye-box 3 via the projection units (plane mirror 30, concave mirror 40) and the transmission reflection unit (windshield 2). Note that the first screen 23 or/and the second screen 24 may be disposed so that the normal direction(s) has/have a predetermined angle from the optical axis/axes of the first display light N1 or/and the second display light N2. In such a case, the first virtual image V1 or/and the second virtual image V2 generated by the HUD 1 is/are visually recognized to be inclined from a vertical direction.

The projection distance extending unit 251 is made up of a single one-side concave lens or biconcave lens having negative refractive power, is disposed on the path of the first projection light L1 between the first projection distance P1 and the divergence point 28, and adjusts the projection distance P of the first projection light L1 to the second projection distance P2 extended from the first projection distance P1. With this, the first projection light L1 is displayed (formed) as the first image M1 that is focused on the first screen 23 disposed at a position further from the projector 20 than the second screen 24.

Note that the projection distance extending unit 251 may be made up of a lens group including a combination of a plurality of types of lenses and having negative refractive power as a whole.

The projection distance shortening unit 252 is made up of a single one-side convex lens or biconvex lens having positive refractive power, is disposed on the path of the second projection light L2 between the second screen 24 and the divergence point 28, and adjusts the projection distance P of the second projection light L2 to the second projection distance P2 shortened from the first projection distance P1. With this, the second projection light L2 is displayed (formed) as the second image M2 that is focused on the second screen 24 disposed to be closer to the projector 20 than the first screen 23.

Note that the projection distance shortening unit 252 may be made up of a lens group including a combination of a plurality of types of lenses and having negative refractive power as a whole.

The first light distribution adjustment unit 291 is an optical system having refractive power larger than that of the second light distribution adjustment unit 292 described below and is made up of, for example, a single convex lens or a lens group including a plurality of types of lenses having positive refractive power and is disposed on the path of the first projection light L1 between the projection distance extending unit 251 and the first screen 23. The first light distribution adjustment unit 291 refracts an optical axis of each image-forming luminous flux 26 emitted from each pixel of the first display region 201 on the display 200 and emits the image-forming luminous flux 26 toward the first screen 23. Even in a case where the image-forming luminous flux 26 (first projection light L1) emitted from each pixel on the display 200 is adjusted by the projection distance extending unit 251 in a divergence direction, it is possible to correct the first display light N1 emitted from each pixel of the first screen 23 in the divergence direction, and therefore, even in a case where the projection distance extending unit 251 is used, it is possible to appropriately direct the first display light N1 emitted from the first screen 23 toward the eye-box 3 of the viewer E.

The second light distribution adjustment unit 292 is an optical system having refractive power smaller than that of the first light distribution adjustment unit 291 and is, for example, an optical system having negative refractive power, is made up of, for example, a single concave lens or a lens group including a plurality of types of lenses, and is disposed on the path of the second projection light L2 between the projection distance shortening unit 252 and the second screen 24. The light distribution adjustment unit 29 refracts an optical axis of each image-forming luminous flux 27 emitted from each pixel of the second display region 202 on the display 200 and emits the image-forming luminous flux 27 toward the second screen 24. Even in a case where the image-forming luminous flux 27 (second projection light L2) emitted from each pixel of the display 200 is adjusted by the projection distance shortening unit 252 in a convergence direction, it is possible to correct the second display light N2 emitted from each pixel of the second screen 24 in a divergence direction, and therefore, even in a case where the projection distance shortening unit 252 is used, it is possible to appropriately direct the second display light N2 emitted from the second screen 24 toward the eye-box 3 of the viewer E.

The display device 10 in this embodiment sets larger refractive power of the first light distribution adjustment unit 291 disposed on the path of the first projection light L1 between the projection distance extending unit 251 and the first screen 23 than refractive power of the second light distribution adjustment unit 292 disposed on the path of the second projection light L2 between the projection distance shortening unit 252 and the second screen 24 and can therefore restrain a shift between distribution of the first display light N1 emitted from the first screen 23 and distribution of the second display light N2 emitted from the second screen 24, which is caused by effects of the projection distance extending unit 251 and the projection distance shortening unit 252. By restraining the shift between the distribution of the first display light N1 and the distribution of the second display light N2 as described above, it is possible to cause the viewer E to visually recognize the first virtual image V1 and the second virtual image V2 having substantially uniform luminance in a case where the viewer E moves his/her point of view within the predetermined eye-box 3.

Note that the refractive power of the first light distribution adjustment unit 291 only needs to be larger than the refractive power of the second light distribution adjustment unit 292, and therefore both the first light distribution adjustment unit 291 and the second light distribution adjustment unit 292 may have positive or negative refractive power. Further, in a case where the first light distribution adjustment unit 291 has positive refractive power or the second light distribution adjustment unit 292 has negative refractive power, it is also possible to provide one of the first light distribution adjustment unit 291 and the second light distribution adjustment unit 292 and omit the other.

The configurations of the display device and the head-up display in the first embodiment of the invention have been described above.

Hereinafter, a second embodiment of the display device and the head-up display in the invention will be described with reference to FIG. 4 and FIG. 5. Note that configurations the same as those of the first embodiment will be denoted by the same reference signs, and detailed description thereof will be omitted.

Figure 4:
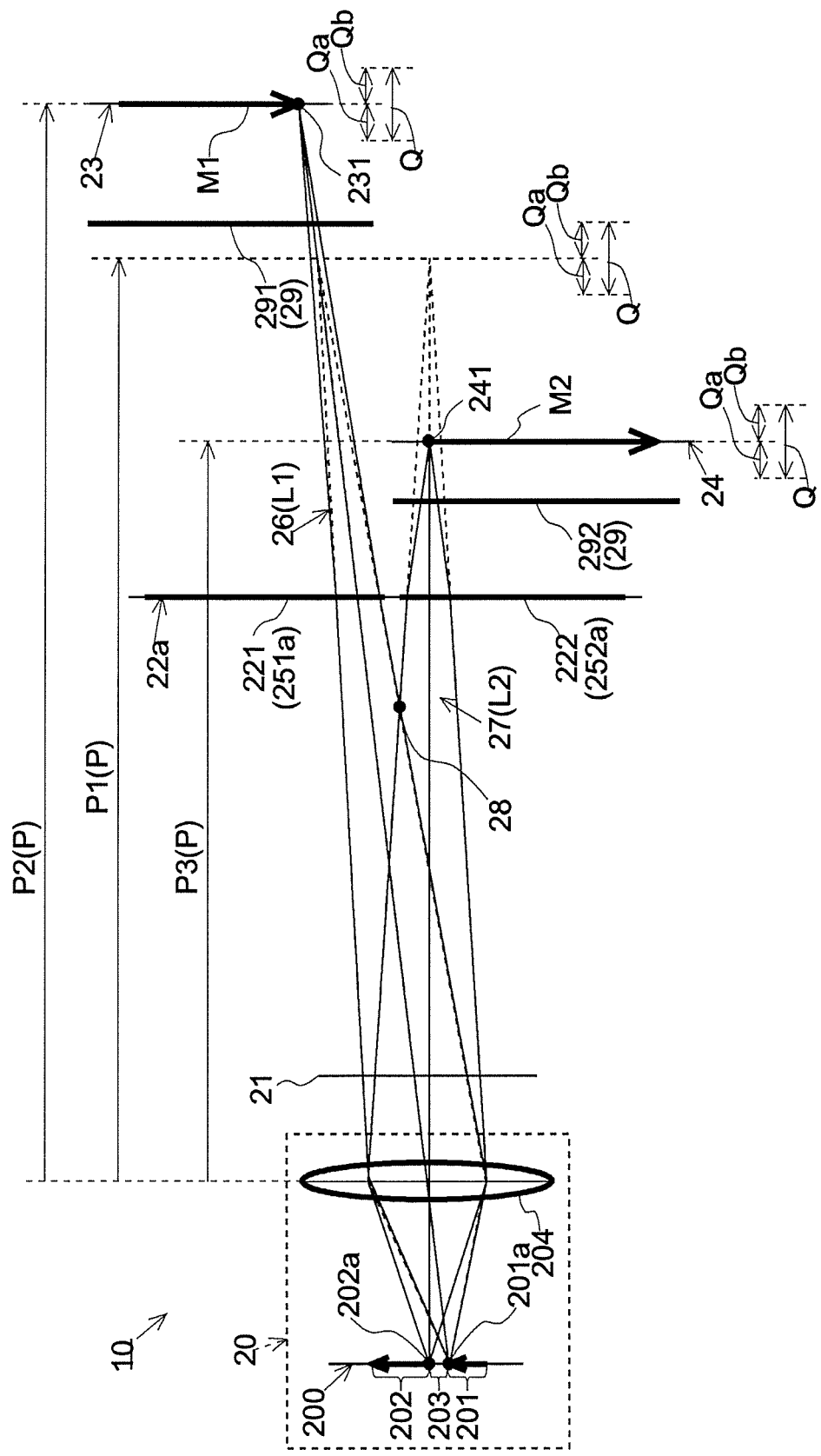
FIG. 4 illustrates a configuration of a display device in the same embodiment and optical paths of projection light.
Figure 5:
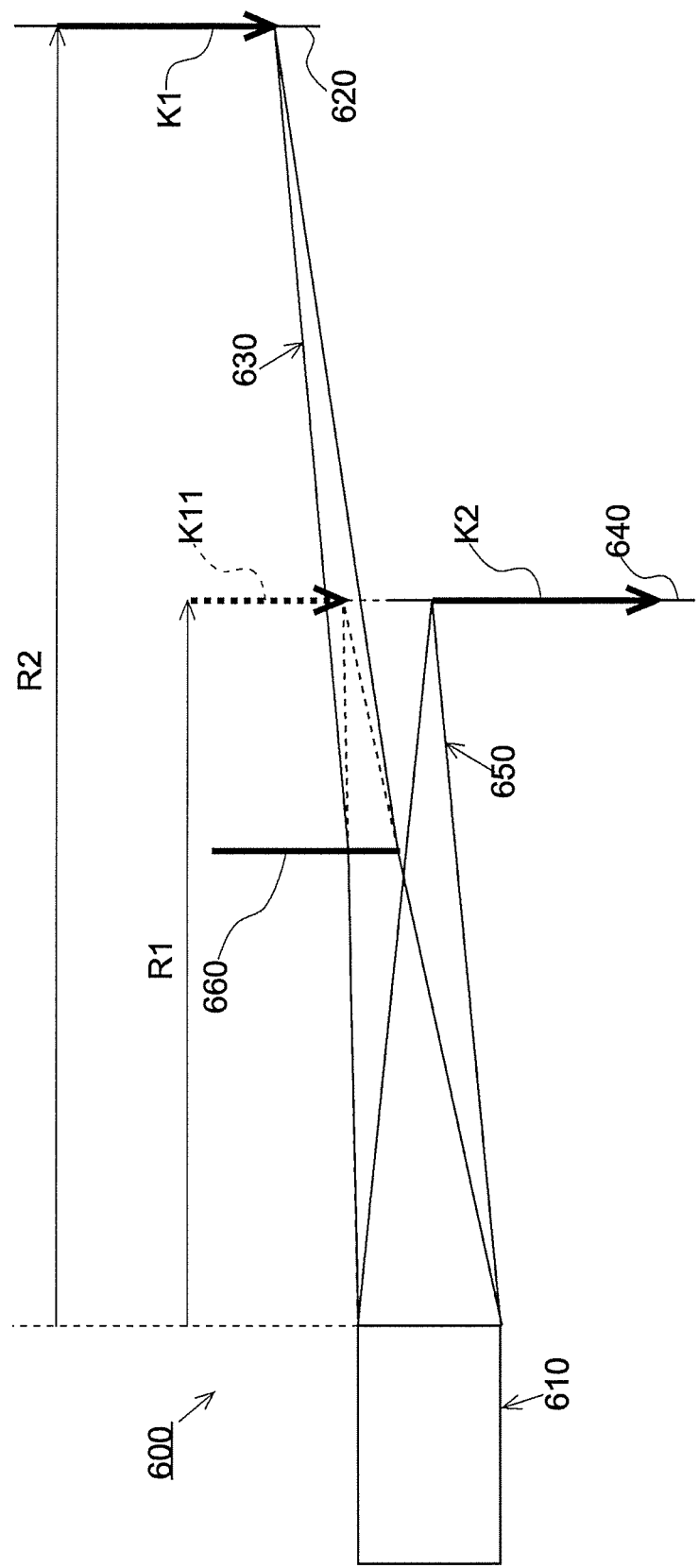
FIG. 5 illustrates a configuration of a conventional display device and optical paths of projection light.

FIG. 4 illustrates a schematic configuration of an HUD 1a in the second embodiment, and FIG. 5 illustrates disposition of optical members in a display device 10a in the second embodiment and optical paths of the first projection light L1 (image-forming luminous flux 26) and the second projection light L2 (image-forming luminous flux 27).

Second Embodiment

The display device 10a in the second embodiment is different from the display device in the first embodiment in that a projection distance extending unit 251a and a projection distance shortening unit 252a are made up of a first reflective curved surface 221 and a second reflective curved surface 222 on a second fold mirror 22a.

The second fold mirror 22a in the second embodiment has at least the first convex reflective curved surface 221 that is disposed further from the projector 20 than the divergence point 28 at which the first projection light L1 and the second projection light L2 diverge, has negative refractive power for reflecting the first projection light L1, and functions as the projection distance extending unit 251a and the second concave reflective curved surface 222 that has positive refractive power for reflecting the second projection light L2 and functions as the projection distance shortening unit 252a.

The first reflective curved surface 221 (projection distance extending unit 251a) is formed as a convex free-form surface having negative refractive power or the like and adjusts the projection distance P of the first projection light L1 to the second projection distance P2 that is extended from the first projection distance P1 adjusted by the image forming unit 204. With this, the first projection light L1 is displayed (formed) as the first image M1 that is focused on the first screen 23 disposed further from the projector 20 than the second screen 24.

The second reflective curved surface 222 (projection distance shortening unit 252a) is formed as a concave free-form surface having positive refractive power or the like and adjusts the projection distance P of the second projection light L2 to the third projection distance P3 that is shortened from the first projection distance P1 adjusted by the image forming unit 204. With this, the second projection light L2 is displayed (formed) as the second image M2 that is focused on the second screen 24 disposed closer to the projector 20 than the first screen 23.

Note that a plurality of second fold mirrors 22a may be provided between the first fold mirror 21 and the second screen 24, and desired refractive power that the projection distance extending unit 251a and the projection distance shortening unit 252a need to have may be configured by refractive power of the plurality of second fold mirrors 22a. Further, the second fold mirror 22 may be dividedly provided, i.e., may be made up of a fold mirror that receives the first projection light L1 and a fold mirror that receives the second projection light L2.

Further, the projection distance extending units 251 and 251a and the projection distance shortening units 252 and 252a may be made up of a combination of the refractive optical system described in the first embodiment and the reflective optical system described in the second embodiment.

As described above, the display device 10 in the invention includes the projector 20 that emits the projection light L having the first projection distance P1; the first screen 23 that is disposed at a position having a distance longer than the first projection distance P1 from the projector 20 along the projection light L, receives the first projection light L1 of the projection light L, and displays the first image M1; the second screen 24 that is disposed at a position having a distance shorter than the first projection distance P1 from the projector 20 along the projection light L, receives the second projection light L2 of the projection light L different from the first projection light L1, and displays the second image M2; the projection distance extending unit 251 that is disposed on the path of the first projection light L1 between the projector 20 and the first screen 23, has negative refractive power, and extends the projection distance P of the first projection light L1; and the projection distance shortening unit 252 that is disposed on the path of the second projection light L2 between the projector 20 and the second screen 24, has positive refractive power, and shortens the projection distance P of the second projection light L2. As described above, the projector 20 projects the projection light L to be formed as an image between the far first screen 23 and the close second screen 24, extends the projection distance P of part (first projection light L1) of this projection light L from the initial first projection distance P1 to the second projection distance P2, and shortens the projection distance P of part (second projection light L2) of the projection light L from the initial first projection distance P1 to the third projection distance P3. This makes it possible to reduce curvatures of the projection distance extending unit 251 and the projection distance shortening unit 252 which adjust the projection distance P. Thus, it is possible to reduce distortion of the first image M1 and the second image M2 and restrain reduction in display quality.

Further, the display device 10 in this invention may further include the second fold mirror 22a (reflection unit) that is disposed on the path of the projection light L between the projector 20 and the first screen 23 and reflects the first projection light L1 and the second projection light toward the first screen 23 and the second screen 24, respectively, in which: the second fold mirror 22 may include the first reflective curved surface 221 (first reflective surface) that reflects the first projection light L1 toward the first screen 23 and the second reflective curved surface 222 (second reflective surface) that reflects the second projection light L2 toward the second screen 24; the projection distance extending unit 251 may be formed on the first reflective curved surface 221; and the projection distance shortening unit 252 may be formed on the second reflective curved surface 222. As described above, the projection distance P of the first projection light L1 can be extended and the projection distance P of the second projection light L2 can be shortened by the second fold mirror 22a, and therefore it is possible to form the first image M1 and the second image M2 on the first screen 23 and the second screen 24 having different projection distances P, respectively, while making the optical path of the projection light L compact by turning back the projection light L.

Further, in the display device 10 in the invention, the second fold mirror 22a may be provided so that the first projection light L1 and the second projection light L2 can be reflected on the same surface. This improves relative position accuracy of the first reflective surface 221 that reflects the first projection light L1 toward the first screen 23 and the second reflective surface 222 that reflects the second projection light L2 toward the second screen 24. Thus, it is possible to restrain an image displayed on each screen from being out of focus and a projection position from being varied due to an assembly error or the like.

Further, the display device 10 in the invention may further include at least one of the first light distribution adjustment unit 291 that is disposed on the path of the first projection light L1 between the projection distance extending unit 251 and the first screen 23 and has predetermined refractive power and the second light distribution adjustment unit 292 that is disposed on the path of the second projection light L2 between the projection distance shortening unit 252 and the second screen 24 and has predetermined refractive power and may set larger refractive power on the path of the first projection light L1 between the projection distance extending unit 251 and the first screen 23 than refractive power on the path of the second projection light L2 between the projection distance shortening unit 252 and the second screen 24.

In the above description, in order to easily understand the invention, description of unimportant publicly-known technical matters has been appropriately omitted.

INDUSTRIAL APPLICABILITY

The invention can be used as, for example, a display device or head-up display to be mounted on a vehicle.

REFERENCE SIGNS LIST 1, 1a HUD (head-up display)
2 windshield (transmission reflection unit)
3 eye-box
10, 10a display device
20 projector
21 first fold mirror
22 second fold mirror
22a second fold mirror
23 first screen
24 second screen
26 image-forming luminous flux
27 image-forming luminous flux
28 divergence point
29 light distribution adjustment unit
30 plane mirror
40 concave mirror
200 display
201 first display region
201a pixel
202 second display region
202a pixel
203 third display region
204 image forming unit
221 first reflective curved surface (first reflective surface)
222 second reflective curved surface (second reflective surface)
251, 251a projection distance extending unit
252, 252a projection distance shortening unit
291 first light distribution adjustment unit
292 second light distribution adjustment unit
E viewer
L projection light
L1 first projection light
L2 second projection light
M1 first image
M2 second image
N display light
N1 first display light
N2 second display light P projection distance
P1 first projection distance
P2 second projection distance
P3 third projection distance
Q focal depth
Qa front focal depth
Qb back focal depth
V1 first virtual image
V2 second virtual image

The invention claimed is:

1. A display device, comprising:
a projector configured to emit first projection light and second projection light both having a first projection distance;
a first screen disposed at a position having a second projection distance longer than the first projection distance from the projector along a path of the first projection light and configured to receive first projection light and display a first image;
a second screen disposed at a position having a third projection distance shorter than the first projection distance from the projector along a path of the second projection light and configured to receive the second projection light and display a second image;
a projection distance extending optical member disposed on the path of the first projection light between the first screen and a divergence point at which the first projection light and the second projection light diverge, having negative power, and configured to extend the projection distance of the first projection light to the second projection distance; and
a projection distance shortening optical member disposed on the path of the second projection light between the second screen and the divergent point, having positive power, and configured to shorten the projection distance of the second projection light to the third projection distance.

2. The display device according to claim 1, further comprising
one or more mirrors have a first reflective surface that reflects the first projection light toward the first screen and a second reflective surface that reflects the second projection light toward the second screen;
the projection distance extending optical member is formed on the first reflective surface; and
the projection distance shortening optical member is formed on the second reflective surface.

3. The display device according to claim 2, wherein
the first reflective surface and the second reflective surface are formed a same surface of the one mirror.

4. The display device according to claim 3, further comprising
a first light distribution adjustment optical member disposed on the path of the first projection light between the projection distance extending optical member and the first screen and having a first optical power, and
a second light distribution adjustment optical member disposed on the path of the second projection light between the projection distance shortening optical member and the second screen and having a second optical power, wherein
the first optical power is larger than the second optical power.

5. The display device according to claim 3, further comprising
a first light distribution adjustment optical member disposed on the path of the first projection light between the projection distance extending optical member and the first screen and having positive refractive power and a second light distribution adjustment optical member disposed on the path of the second projection light between the projection distance shortening optical member and the second screen and having negative refractive power.

6. The display device according to claim 2, further comprising
a first light distribution adjustment optical member disposed on the path of the first projection light between the projection distance extending optical member and the first screen and having a first optical power, and
a second light distribution adjustment optical member disposed on the path of the second projection light between the projection distance shortening optical member and the second screen and having a second optical power, wherein
the first optical power is larger than the second optical power.

7. The display device according to claim 2, further comprising
a first light distribution adjustment optical member disposed on the path of the first projection light between the projection distance extending optical member and the first screen and having positive refractive power and a second light distribution adjustment optical member disposed on the path of the second projection light between the projection distance shortening optical member and the second screen and having negative refractive power.

8. The display device according to claim 1, further comprising
a first light distribution adjustment optical member disposed on the path of the first projection light between the projection distance extending optical member and the first screen and having a first optical power; and
a second light distribution adjustment optical member disposed on the path of the second projection light between the projection distance shortening optical member and the second screen and having a second optical power, wherein
the first optical power is larger than the second optical power.

9. The display device according to claim 1, further comprising
a first light distribution adjustment un optical member it disposed on the path of the first projection light between the projection distance extending optical member and the first screen and having positive refractive power and a second light distribution adjustment optical member disposed on the path of the second projection light between the projection distance shortening optical member and the second screen and having negative refractive power.

10. A head-up display, comprising:
a projector configured to emit first projection light and second projection light both having a first projection distance;
a first screen disposed at a position having a second projection distance longer than the first projection distance from the projector along a path of the first projection light and configured to receive the first projection light and display a first image;
a second screen disposed at a position having a third projection distance shorter than the first projection distance from the projector along a path of the second projection light and configured to receive the second projection light and display a second image;
a projection distance extending optical member disposed on the path of the first projection light between the first screen and a divergence point at which the first projection light and the second projection light diverge, having negative power, and configured to extend the projection distance of the first projection light to the second projection distance;
a projection distance shortening optical member disposed on the path of the second projection light between the second screen and the divergence, having positive power, and configured to shorten the projection distance of the second projection light to the third projection distance; and
a projector configured to project the first image displayed on the first screen and the second image displayed on the second screen toward a transmission reflection unit that is positioned in front of a viewer and cause the viewer to visually recognize virtual images based on the first image and the second image via the transmission reflection unit, wherein
the first screen is disposed so that an optical path of light based on the first image travelling toward the viewer is shorter than an optical path of light based on the second image.

11. The head-up display according to claim 10, further comprising
one or more mirrors have a first reflective surface that reflects the first projection light toward the first screen and a second reflective surface that reflects the second projection light toward the second screen;
the projection distance extending optical member is formed on the first reflective surface; and
the projection distance shortening optical member is formed on the second reflective surface.

12. The head-up display according to claim 11, wherein the first reflective surface and the second reflective surface are formed on a same surface of the one mirror.

13. The head-up display according to claim 12, further comprising
a first light distribution adjustment optical member disposed on the path of the first projection light between the projection distance extending optical member and the first screen and having a first optical power, and
a second light distribution adjustment optical member disposed on the path of the second projection light between the projection distance shortening optical member and the second screen and having a second optical power, wherein
the first optical power is larger than the second optical power.

14. The head-up display according to claim 12, further comprising
a first light distribution adjustment optical member disposed on the path of the first projection light between the projection distance extending optical member and the first screen and having positive refractive power and a second light distribution adjustment optical member disposed on the path of the second projection light between the projection distance shortening optical member and the second screen and having negative refractive power.

15. The head-up display according to claim 11, further comprising
at least one of a first light distribution adjustment optical member disposed on the path of the first projection light between the projection distance extending optical member and the first screen and having a first optical power, and
a second light distribution adjustment optical member disposed on the path of the second projection light between the projection distance shortening optical member and the second screen and having a second optical power, wherein
the first optical power is larger than the second optical power.

16. The head-up display according to claim 11, further comprising
a first light distribution adjustment optical member disposed on the path of the first projection light between the projection distance extending optical member and the first screen and having positive refractive power and a second light distribution adjustment optical member disposed on the path of the second projection light between the projection distance shortening optical member and the second screen and having negative refractive power.

17. The head-up display according to claim 10, further comprising
a first light distribution adjustment optical member disposed on the path of the first projection light between the projection distance extending optical member and the first screen and having a first optical power, and
a second light distribution adjustment optical member disposed on the path of the second projection light between the projection distance shortening unit and the second screen and having a second optical power, wherein
the first optical power is larger than the second optical power.

18. The head-up display according to claim 10, further comprising
a first light distribution adjustment optical member disposed on the path of the first projection light between the projection distance extending optical member and the first screen and having positive refractive power and a second light distribution adjustment optical member disposed on the path of the second projection light between the projection distance shortening optical member and the second screen and having negative refractive power.

* * * * *